May 5, 1936.  C. H. HOWLAND-SHEARMAN  2,039,845
SYNCHRONIZING FLYWHEEL AND GEAR DRIVES
Filed July 27, 1934   2 Sheets-Sheet 2

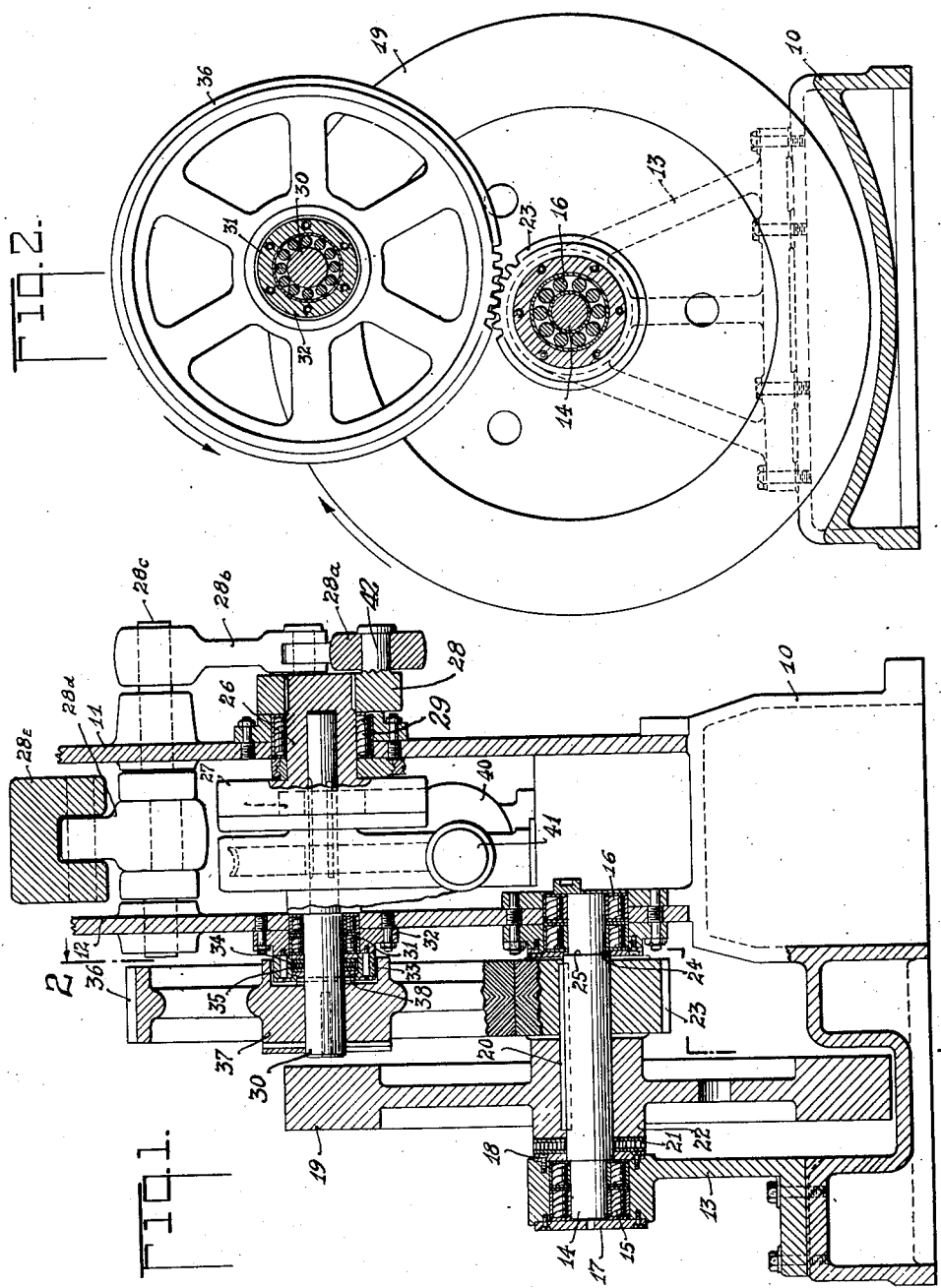

INVENTOR
CHARLES H. HOWLAND-SHEARMAN
BY
ATTORNEY

Patented May 5, 1936

2,039,845

UNITED STATES PATENT OFFICE 2,039,845

SYNCHRONIZING FLYWHEEL AND GEAR DRIVES

Charles H. Howland-Shearman, Hamden, Conn.

Application July 27, 1934, Serial No. 737,162

4 Claims. (Cl. 74—421)

This invention pertains to balancing and energy storing means for use on machine tools, especially those having massive reciprocating or oscillating working parts. While it is particularly adapted for use on the cold-flow producing machine called the Kinetor, the general structure of which is fully described and claimed in copending application Serial No. 737,160 its application is not limited thereto, as it may be used advantageously on a variety of other tools such as punch presses, planers, broaches and the like.

The principal object of the invention is to provide inertia means to balance the weight of all working parts of the machine in order that the energy of the prime mover may be applied directly to the work smoothly and without the necessity of overcoming the inertia of the parts, that is, in direct proportion to the resistance of the work.

Another object is to provide a device of the above character in which the parts may be quickly and smoothly resynchronized or returned to normal speed after performance of the work.

A further object is to provide a structure of the above nature that is compact and relatively small.

Another purpose is to provide means by which the flywheel and related parts may adjust their position to their natural weave without undue restraint as the work comes on.

In pursuance of the above and related objects, an embodiment of the invention is hereinafter described in connection with the attached drawings, in which Figure 1 is a cross sectional view of the device applied to the power shaft of a machine tool.

Figure 2 is a longitudinal section of the same on the lines 2—2, Figure 1.

Figure 3:
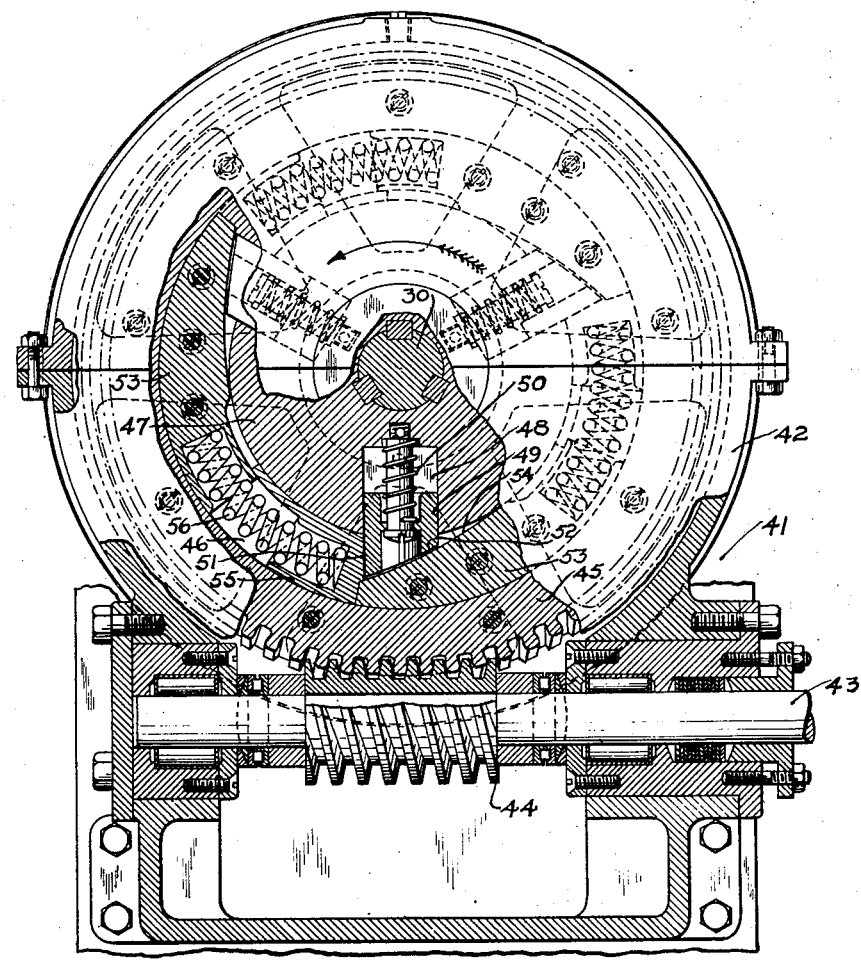
Figure 3 is an end view partly in section of the flexible speed reducing drive mechanism.

Referring to Figure 1, the numeral 10 indicates the base of a machine tool, to which are attached side plates 11 and 12, and a pedestal 13. A wheel shaft 14 is journalled in roller bearings 15 and 16 mounted in the pedestal 13 and side plate 12 respectively. An end plate 17 and a ring plate 18 surrounding the shaft 14 are fastened to the pedestal 13, retaining the bearing 15 in position longitudinally.

A flywheel 19 is fastened to the shaft by means of a key 20, a thrust bearing 21, preferably of the multiple roller type, being disposed between the hub 22 of flywheel 19 and the ring plate 18.

A herringbone pinion 23 is also fastened to the shaft 15 by the key 20. A small amount of clearance 24 is provided between the shoulder 25 of shaft 15 where it enters the bearing 16 and the bearing itself, in order to permit the shaft 15 to float slightly to the right for reasons hereinafter explained.

A hub 26, forming part of the driven member of a suitable clutch 27 and carrying any desired means such as a crank plate 28 having a crank pin 42 for delivering power to the work performing parts of the machine which parts are illustrated by a connecting rod 28a, lever 28b, crankshaft 28c, link 28d and tool beam 28e, is journalled in a roller bearing 29 retained in the side plate 11. A power shaft 30 is journalled in the hub 26 and in a roller bearing 31 retained in the side plate 12 by means of a flange 32 and ring plate 33. The ring plate 33 has an inner flange 34 forming the backing for a second thrust bearing 35.

A herringbone gear 36, meshing with the pinion 23, is keyed to the power shaft 30. Disposed between the hub 37 of gear 36 and the thrust bearing 35 is a rigid thrust ring 38. The driving member 39 of the clutch 27 is also keyed to the power shaft 30. Power from a prime mover 40 may be delivered to the shaft 30 by a worm and gear speed reducer 41 which may be of the flexible free-wheeling type described and claimed in copending application Serial No. 737,154, in which the resilient driving means is adapted to normally exert a moment equal to the moment of inertia of the flywheel and attached parts, and which is herein illustrated in Figure 3.

Referring to Figure 3, the numeral 42 indicates a casing in which is journaled a worm shaft 43 adapted to be driven by the prime mover 40, Figure 1. The shaft 43 carries a worm 44 meshing with a worm gear ring 45 secured to side plates 46 rotatably mounted on the shaft 30.

A driven disk 47 is keyed to the shaft 30 between the side plates 46 and has radial slots 48 in which are radially slidable plungers 49 urged outward by springs 50. The plungers 49 have radial contact surfaces 51 and inclined outer surfaces 52.

Primary driving members or segments 53 are secured to the side plates 46 inside the ring 45. The members 53 have inclined inner surfaces 54. Curved secondary driving members 55 slidable inside the ring 45, are disposed between the primary drivers 53. Curved helical springs 56 are disposed between the primary members 53 and secondary driving members 55 so as to normally urge the latter forward against the contact surfaces 51 of plungers 49. Thus power delivered to the ring 45 by the worm is transmitted through the primary driving members 53 to the springs

56, thence through the secondary members 55, plungers 49 and disk 47 to the shaft 30.

When the machine is running light the initial compression of the springs 56 is sufficient to maintain the driving force, so that the parts revolve in the position shown in Figure 3. When a heavy load is placed on the shaft 30, as for instance when the machine is called upon to perform heavy work, tending to slow down the shaft 30, the gears and flywheel 19, the additional pressure on springs 56 causes them to contract until their resistance equals the driving pressure. The strength of the springs 56 is such that in their normal condition as shown in Figure 3 their expensive pressure is just sufficient to exert a torque moment equal to the combined moments of inertia of the shafts 30 and 14, gears 36 and 23 and flywheel 19. When, therefore, after the springs have been compressed under working load, the working load falls off, the springs 56 in expanding quickly restore to the above named parts just sufficient torsional energy to quickly bring the latter to their original or synchronous speed.

When the prime mover 40 is turned off to stop the machine, or when it is temporarily slowed down as for instance during a drop in supply line voltage, the driven disk 47 may run ahead of the driving ring 45, the latches sliding up the inclined surfaces 54 of members 53 so as to over-ride the latter while compressing the springs 50. The device is thus able to "free-wheel", relieving the worm 40 and attached prime mover of the strain of slowing down the flywheel and other heavy rotary parts.

The operation of the device is as follows:

During the idling portion of the cycle of the machine tool, for instance on the up-stroke of a cold-flowing machine, or while the clutch 27 is released, the prime mover 40 delivers power through the flexible speed reducer 41, shaft 30, gear 36, pinion 23 and flywheel shaft 14 to the flywheel 19, which stores the energy thus delivered. The combined moment of inertia of the flywheel 19, flywheel shaft 14 and gear 23 is made equal to the combined moments of inertia of all the other working parts of the machine. As a result, at the start of the working phase of the machine's cycle the inertia of all working parts is balanced by that of the flywheel and attached parts noted, the effect being that of removing all weight from the working parts. This exact balancing of the moments of inertia of the flywheel and driven parts is of importance, as it permits initial delivery of power from the prime mover directly to the work in exact proportion to that required by the latter, that is in synchronism. With either a larger or smaller flywheel moment either the weight or inertia of the working parts or the excess moment of the flywheel constitutes an unbalancing factor which causes either a greater or smaller delivery of power to the work than that required to initiate the latter properly and smoothly. In other words, the synchronizing flywheel causes the machine to deliver power exactly in proportion to the natural resistance of the work which is thereby performed in the most advantageous manner, without fracture or distortion due to excessive power or straining and undue slow-down caused by an insufficient flywheel effect. As the resistance of the work is completed and the load falls in consequence, the flexible drive device 40 being balanced in resilient strength against the moment of inertia of the flywheel, reacts to restore the latter to its initial or synchronous speed slightly above the working speed of the machine, and is thus conditioned to perform its next task in overcoming the inertia of the working parts.

The gear 36 being large in proportion to the pinion 23, the rotative speed of the flywheel is proportionately greater than that of the power shaft 30. This high rotative speed of the flywheel gives it large energy-storing capacity in proportion to its relatively small size and weight, and consequently the ability to balance out the inertia of rest of the working parts with very small drop in speed.

During the storage of energy in the flywheel and during the re-delivery thereof through the gear train, a natural tendency to axial weave occurs, as is common to rotative machinery. The clearance 24, previously noted, permits the gears to float sufficiently to find their natural relative positions and mutual adjustment to permit this weave without undue strain. The thrust bearing 35 limits the floating clearance to the right, while the thrust bearing 21 furnishes a limit to the left. While power is being delivered to the pinion 23 by gear 36, that is during storage, the tendency is for the gear 36 to weave slightly to the right where the thrust is taken directly by the bearing 35, while the pinion 23 floats to its natural position with respect to the gear.

Similarly, when the flywheel 19 is re-delivering power to the gear 36, the weave of the flywheel carries it to the left, where the thrust is taken by the bearing 21, allowing the gear 36 to float to position. Thus, when power is being delivered from either member to the other, the weaving thrust is absorbed directly from the driver by a thrust bearing and is not transmitted through the gears. This structure insures free running and proper functioning of the device in maintaining proper power delivery as previously set forth.

While the device is shown in preferred form, the invention is not limited to the exact structure illustrated as various modifications may be made without departing from the scope of the appended claims.

What is claimed is:

1. In a machine tool in combination a power shaft, a second shaft, a flywheel secured on said second shaft, gear means to transmit energy from said power shaft to said flywheel and from said flywheel to said power shaft, means to limit the axial motion of said power shaft when energy is being delivered to said flywheel, means to limit the axial motion of said second shaft when energy is being transmitted from said flywheel to said power shaft, a clutch having its driving member secured to said power shaft, a sleeve rotatably mounted on said power shaft and having secured thereon the driven member of said clutch, and a crank secured to said sleeve.

2. In a machine tool in combination a power shaft, a second shaft, a flywheel secured on said second shaft, gear means to transmit energy from said power shaft to said flywheel and from said flywheel to said power shaft, means to limit the axial motion of said power shaft when energy is being delivered to said flywheel, means to limit the axial motion of said second shaft when energy is being transmitted from said flywheel to said power shaft, said gear means including directly meshing herringbone gears of different diameters on said shafts whereby said shafts are adapted to revolve in opposite directions at different speeds, and a clutch on said power shaft and operable to connect said shaft to a machine part to be driven.

3. In a machine tool in combination, parts adapted to apply energy to a material to be worked, means to store rotative energy, said storing means having a moment of inertia substantially equal to the combined moments of inertia of said energy applying parts, a motor, and resilient means to transmit energy from said motor to said applying means and to said storing means, said resilient means including springs permanently compressed to a predetermined degree and adapted at said predetermined degree of compression to transmit a moment substantially equal to the moment of inertia of said storing means.

4. In a machine tool in combination a power shaft, a clutch thereon, parts operable by said power shaft through said clutch to apply energy to a material to be worked, a second shaft, a flywheel fastened on said second shaft, a gear on said power shaft, a second gear fastened to said second shaft and meshing with said first gear, said second gear being of smaller diameter than said first gear, thrust-absorbing means to limit axial movement of said power shaft in one direction and of said second shaft in the opposite direction, said flywheel, said shafts and said gears having a combined moment of inertia substantially equal to that of said energy applying parts, a motor, and resilient means to transmit energy from said motor to said power shaft, said resilient means including springs permanently compressed to a predetermined degree and adapted at said predetermined degree of compression to normally transmit a moment equal to the combined moments of inertia of said flywheel, shafts and gears.

CHARLES H. HOWLAND-SHEARMAN.